United States Patent [19]

Hunter et al.

[11] Patent Number: 5,485,518
[45] Date of Patent: Jan. 16, 1996

[54] ELECTRONIC MEDIA PROGRAM RECOGNITION AND CHOICE

[75] Inventors: Robert M. Hunter; Frank M. Stewart, both of Bozeman, Mont.

[73] Assignee: Yellowstone Environmental Science, Inc., Bozeman, Mont.

[21] Appl. No.: 129,450

[22] Filed: Sep. 30, 1993

[51] Int. Cl.⁶ ................................................. H04N 7/167
[52] U.S. Cl. ............................................ 380/20; 348/5.5
[58] Field of Search ................................ 380/20; 348/5.5

[56] References Cited

U.S. PATENT DOCUMENTS

| | | |
|---|---|---|
| 3,919,479 | 6/1975 | Moon et al. . |
| 4,081,754 | 5/1977 | Jackson . |
| 4,228,543 | 4/1980 | Jackson . |
| 4,230,990 | 11/1980 | Lert, Jr. et al. . |
| 4,450,531 | 9/1984 | Kenyon et al. . |
| 4,511,917 | 2/1985 | Kohler et al. . |
| 4,528,589 | 7/1985 | Block et al. . |
| 4,547,804 | 8/1985 | Greenberg . |
| 4,639,779 | 4/1987 | Greenberg . |
| 4,677,466 | 7/1987 | Lert, Jr. et al. . |
| 4,685,131 | 8/1987 | Horne ........................................ 380/20 |
| 4,697,209 | 9/1987 | Kiewit et al. . |
| 4,739,398 | 6/1988 | Thomas et al. . |
| 4,843,562 | 5/1989 | Kenyon et al. . |
| 4,918,730 | 2/1990 | Schulze . |
| 4,930,158 | 4/1990 | Vogel . |
| 4,930,160 | 7/1990 | Vogel . |
| 4,931,871 | 8/1990 | Kramer . |
| 4,967,273 | 11/1990 | Greenberg . |
| 5,019,899 | 4/1991 | Boles et al. . |
| 5,060,079 | 8/1991 | Rufus-Isaacs . |
| 5,168,372 | 3/1992 | Sweetser . |

Primary Examiner—Stephen C. Buczinski

[57] ABSTRACT

A method and apparatus for electronic media program recognition and choice are disclosed. The invention allows parental control of the individual television programs (e.g., series, episodes, or individual music videos) and radio programs that can be viewed or listened to by young children. The invention can be practiced without the need for or reliance on a Government or industry-wide program rating system or a "V-chip" approach. The invention automatically locks out (blocks) all programs that have not been determined by the parent to be suitable for child viewing. Suitable programs are unlocked and viewable whenever they are broadcast. Means are provided for implementing two strategies for discrimination among TV programs. Signal processing means and signal recognition software are relied upon in situations wherein program identification information is not encoded in the composite television signal. Two approaches to signal recognition are provided: video signal (e.g., title screen) recognition and audio signal (e.g., theme song) recognition. In event that Extended Data Service (EIA-608) data are available the capability to read and recognize program identifiers (e.g., names) is also provided.

20 Claims, 2 Drawing Sheets

ELECTRONIC MEDIA PROGRAM RECOGNITION AND CHOICE

BACKGROUND OF THE INVENTION

The background of the invention is set forth in two parts: the field of the invention and the description of related art.

1. Field of the Invention

This invention relates to a method and apparatus for electronic media program recognition and choice. In particular, it relates to a method and apparatus for recognition of radio and television programs and choice of appropriate programs by the listener/viewer. The programs may either be broadcast or stored on videotape or other storage media.

2. Description of Related Art

Radio and television communications pervade the human environment. Some of those capable of receiving these communications would prefer to be able to more easily choose the programs to which they and/or their children are exposed. Empowerment of this portion of the listening/viewing audience involves providing means for automatic program recognition and selection or blocking. Without such empowerment, excessive censoring of electronic media could occur.

Prior art means for automatic program recognition and selection or blocking are relatively unsophisticated or impractical. U.S Pat. Nos. 4,081,754 by Jackson, May 24, 1977 and 4,228,543 by Jackson, Oct. 14, 1980 disclose means whereby a parent can preset a device to block channels or individual programs based on a prior knowledge of their broadcast schedule. A commercially-available embodiment of this concept has the trade name "Telecommander." With these technologies, the day, time, and channel of objectionable programs must be known and unvarying. Moreover, if a large number of individual objectionable programs are scheduled to be broadcast, these technologies can require much time-consuming programming.

U.S. Pat. No. 4,930,158 by Vogel, May 29, 1990 discloses a selective video playing system. This system requires that a user input a security code to enable selection of videos within a set of classification codes for playing. U.S. Pat. No. 4,930,160 by Vogel, May 29, 1990 discloses a method for automatic censorship of video programs. The method involves storing a set of video program classification codes, receiving a video signal and a program classification code descriptive of the signal, comparing the code with the set of codes in memory, and either causing the video signal to be displayed or, if appropriate, causing an alternative video signal to be played. Thus, with these inventions, classification codes (program ratings) must be received with the video signal that can be used to enable or disable a user choice. Government action could be required to ensure the presence and proper use of program classification codes. Moreover, some parents will disagree with some of the program ratings and be powerless to prevent the viewing of programs they deem unsuitable. This approach is popularly termed the "V-chip" approach.

U.S. Pat. No. 5,060,079 by Rufus-Isaacs, Oct. 22, 1991 discloses an apparatus for controlling television monitoring. It provides an arrangement for limiting the time that a viewer can view television. U.S. Pat. No. 5,168,372 by Sweetser, Dec. 1, 1992 discloses a television viewing control system for monitoring and controlling the viewing time of a plurality of viewers watching a television set and disabling viewing when a predetermined viewing time has expired. A commercially-available embodiment of this concept has the trade name "TimeOut." Thus, with these inventions, all programming over a preselected amount is blocked. Significantly, unsuitable programs may be viewed if a child's viewing time has not been expended.

The prior art discloses a variety of broadcast signal recognition means. U.S. Pat. No. 3,919,479 by Moon et al., Nov. 11, 1975 discloses a broadcast signal identification system. U.S. Pat. No. 4,230,990 by Lert, Jr. et al., Oct. 28, 1980 discloses a broadcast program identification method and system. U.S. Pat. No. 4,450,531 by Kenyon et al., May 22, 1984 discloses a broadcast signal recognition system and method. U.S. Pat. No. 4,511,917 by Koähler et al., Apr. 16, 1985 discloses a method for determining agreement between an analysis signal and at least one reference signal. U.S. Pat. No. 4,547,804 by Greenberg, Oct. 15, 1985 discloses a method and apparatus for the automatic identification and verification of commercial broadcast programs. U.S. Pat. No. 4,639,779 by Greenberg, Jan. 27, 1987 discloses a method and apparatus for the automatic identification and verification of television broadcast programs. U.S. Pat. No. 4,677,466 by Lert, Jr. et al., Jun. 30, 1987 discloses a broadcast program identification method and apparatus. U.S. Pat. No. 4,697,209 by Kiewit et al., Sep. 29, 1987 discloses methods and apparatus for automatically identifying programs viewed or recorded. U.S. Pat. No. 4,739,398 by Thomas et al., Apr. 19, 1988 discloses a method, apparatus, and system for recognizing broadcast segments. U.S. Pat. No. 4,843,562 by Kenyon et al., Jun. 27, 1989 discloses a broadcast system and method. With this method, a spectragram of broadcast information is produced and compared to reference spectragrams. Pattern recognition methods are used to recognize the information. U.S. Pat. No. 4,918,730 by Schulze, Apr. 17, 1990 discloses a process and circuit arrangement for the automatic recognition of signal sequences. U.S. Pat. No. 4,931,871 by Kramer, Jun. 5, 1990 discloses a method and system for identification and verification of broadcast program segments. U.S. Pat. No. 4,967,273 by Greenberg, Oct. 30, 1990 discloses a television program transmission verification method and apparatus. U.S. Pat. No. 5,019,899 by Boles et al., May 28, 1991 discloses an electronic data encoding and recognition system. With all of these inventions, program recognition does not trigger program unlocking. All of the U.S. patents referenced herein are incorporated by reference into this disclosure as if fully set forth herein.

SUMMARY OF THE INVENTION

The present invention provides a method and apparatus for recognition of electronic media programs and for choice among available programs. The present invention locks out all programs that have not been determined by an adult to be suitable for listening or viewing by family members. The method and apparatus are appropriate for recognition of cable or wireless (e.g., radio or television) communications or for recognition of programs played back from storage media. The method and apparatus empower the listener/viewer to automatically implement his/her program choices in a time-efficient manner.

For the purposes of this disclosure, the term "electronic media" means an electronic means of communication affording diversion, amusement, information, or education. The word "program" means either a radio or television performance or production or a coordinated group of performances or productions. Examples of programs include series, episodes, and individual music videos. The word "choice" means the act or an instance of selection or deselection or the right or opportunity to choose and suggests the power of choosing among possibilities. The word "broadcast" means a cable or wireless communication which may be transmitted from either a radio or a television transmitter. The word "signal" means composite audio-video signal, a coded portion of composite signal, such as a closed caption, a separate audio signal, or a separate video or audio signal. The term "storage media" means any means of storing entertainment programs, such as optical disk, videotape, cassette tape, etc.

Means are provided for implementing two strategies for discrimination among TV programs. Signal processing means and signal recognition software are relied upon in situations wherein program identification information is not encoded in the composite television signal. In that event that Extended Data Service (EDS) data become available in accordance with Standards Proposal No. 3191 of the Electronic Industries Association, dated Jun. 24, 1993, (which, if approved, will be published as EIA-608), the capability to read and recognize program identifiers (e.g., names) is also provided. This strategy is made feasible by the requirement in the Television Decoder Circuitry Act of 1990 that all TV receivers manufactured after Jul. 1, 1993, contain a teletext decoder chip. This requirement has resulted in a significant reduction of the unit cost of such chips. The availability of EDS information will make program discrimination essentially error-free.

Two approaches to signal recognition are provided: video signal (e.g., title screen) recognition and audio signal (e.g., theme song) recognition. In both instances, multiple channels are scanned either continuously or at least during periods when program changes normally occur, e.g., on the hour and half hour after a blanking signal or silence. Program recognition "unlocks" the channel upon which it is being broadcast for the normal duration of the program. Signal recognition is accomplished by means of a digital signal processor.

Device software allows menu-driven choice of programs that are suitable for viewing by the children of the household. In a preferred embodiment, the adult is presented with a listing of the names of the programs (or another program identifier) that the device is capable of recognizing. If available, the Motion Picture Association of America (MPAA) rating, NR (satellite) rating, or proposed codes for violence (V), language (L), or nudity (N) are presented next to the program name. A remote control receiver or a plurality of set-top keys is used to scroll through the listing and to select or unselect programs as suitable for child viewing. The listing is displayed either on the TV screen (e.g., as teletext) or on an integral display built into the device. In another embodiment, the parent selects the program name(s) and channel (or range of channels), day (or range of days), start time (or range of start times) of suitable programs. These instructions are used by the device to sample the next program occurrence and to add signal recognition data (signatures) to its database of suitable programs. Then, whenever the program(s) is/are aired, they are recognized as suitable for child viewing and allowed to be displayed.

The present invention provides a variety of advantages over the prior art. One object of the invention is to allow parental control of the channels and individual television and radio programs that can be viewed or listened to by young children without the need for or reliance on a Government or industry-wide program rating system. Reliance on such rating schemes is unwise because they do not currently exist and, if they are created, many parents will not agree with the ratings that they produce.

Another object of the invention is to automatically lock out all channels and all programs that have not been determined by the parent to be suitable for child viewing. This is advantageous in situations in which the number of suitable programs is much lower than the number of unsuitable programs. The presumption is that less exposure of young children to currently-available electronic media is better than more and that unlocking relatively few suitable programs will require much less parental effort than choosing the numerous programs to lock out (block).

Another object of the invention is to unlock and make viewable suitable programs whenever they are broadcast. Thus, reliance on the accuracy of a program schedule is not required. This capability will become even more important as programs become available on demand (broadcast at any time) in the future.

Another object of the invention is to allow control of the device by an authorized user by means of voice recognition technology. This feature eliminates the device programming challenge of prior art devices. Further objects and advantages of the invention will become apparent from consideration of the drawings and the ensuing description of it.

BRIEF DESCRIPTION OF THE DRAWINGS

The features of the invention will be better understood by reference to the accompanying drawings which illustrate presently preferred embodiments of the invention.

In the drawings.

Figure 1:
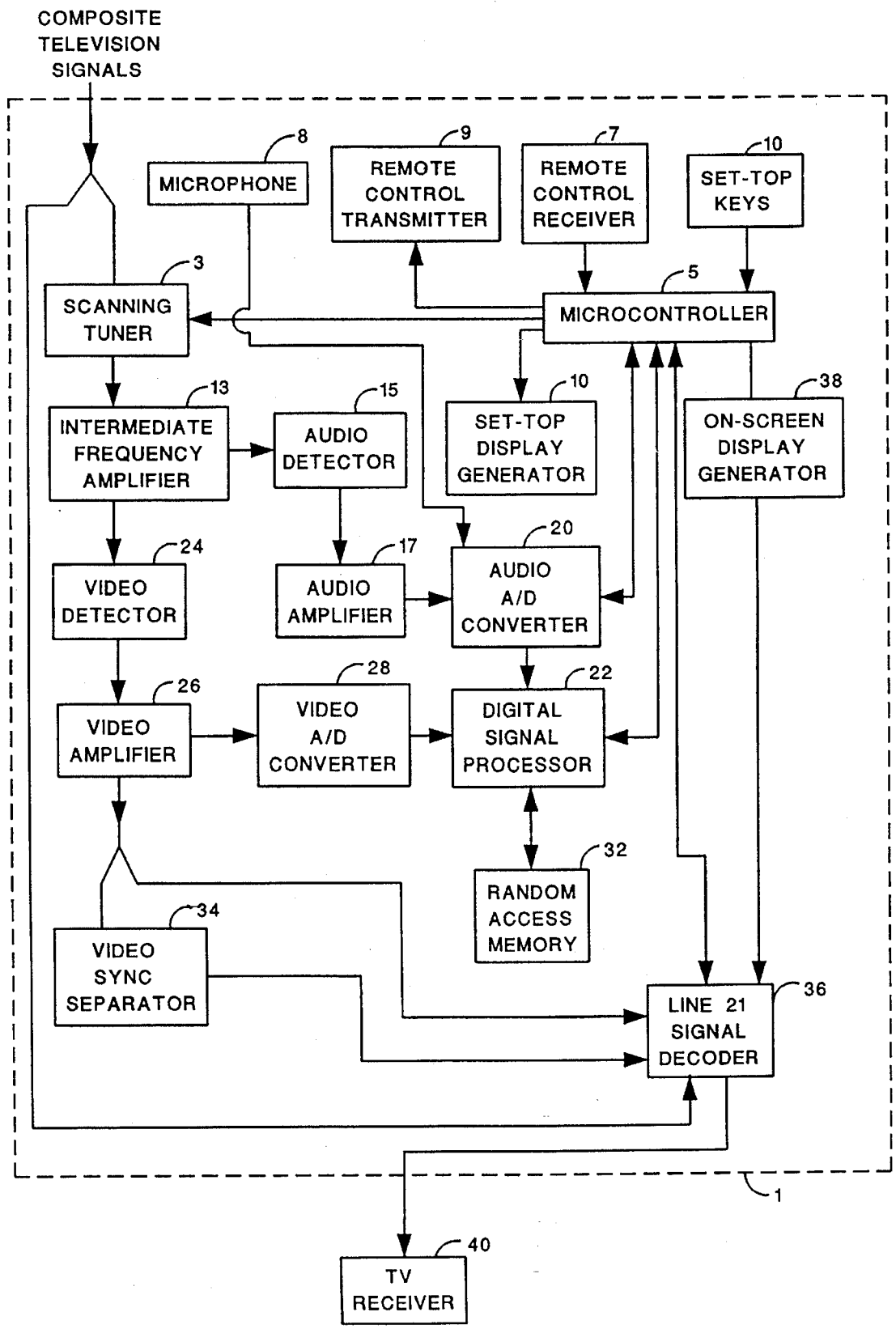
FIG. 1 is a functional block diagram of a preferred embodiment of the invention.

The following reference numerals are used to indicate the parts or steps of the invention on the drawings:
1 Apparatus
3 Scanning tuner
5 Microcontroller
7 Remote control receiver
8 Microphone
9 Remote control transmitter
10 Set-top keys
13 Intermediate frequency amplifier
15 Audio detector
17 Audio amplifier
20 Audio A/D converter
24 Video detector
22 Digital signal processor
26 Video amplifier
28 Video A/D converter
32 Random access memory
34 Video sync separator
36 Signal decoder
38 On-screen display generator
40 Television (TV) receiver
100 Lock out all programs
102 Input choice of suitable programs
104 Scan appropriate channels
106 Sample suitable program signals
108 Obtain suitable program signatures
110 Display listing of suitable programs
112 Update choice of suitable programs
114 Add signatures of suitable programs to memory
116 Scan selected channels
118 Sample unidentified program signals
120 Obtain unidentified program signals 122 Select mode of operation
124 Compare unidentified program signatures to suitable program signatures
126 Unlock suitable programs
130 Override lock out
132 Update correlation requirement

DESCRIPTION OF THE PREFERRED EMBODIMENTS

Reference is now made to FIG. 1 which is a functional block diagram of a preferred embodiment of the invention. This embodiment is appropriate for recognition and choice of television programs. Composite television signals, each comprising a carrier component, a video component, an audio component, and various control pulses are input to apparatus 1. Each composite signal contains the information required to reproduce one television channel. These composite signals are simultaneously routed to scanning tuner 3 and signal decoder 36. Tuner 3, which is preferentially controlled by microcontroller 5, intermittently tunes the device to each of the composite signals. In a preferred embodiment, an authorized user inputs information into microcontroller 5 by means of a voice recognition subsystem. The voice recognition subsystem includes microphone 8. In an alternative embodiment, an authorized user inputs suitable channels into microcontroller 5 by means of remote control receiver 7 or set-top keys 10 and device 1 is tuned only into the suitable channels by tuner 3. Microcontroller 5 may be a microprocessor, such as one from the Motorola M68000 family, it may be a single-chip microcontroller, such as one from the Motorola M68300 family, or it may be network processing unit, such as the Hitachi HD64180S. In an alternative embodiment, operational signals (e.g., channel advance signals) may be sent to television (TV) receiver 40 via remote control transmitter 9.

A listing of suitable programs may be displayed via on-screen display generator 38 on TV receiver 40. In an alternative embodiment, the listing may be displayed on set-top display generator 10. Set-top display 10 may incorporate a liquid crystal display (LCD), light emitting diodes (LCD), or vacuum fluorescent display technology.

During the time that device 1 is tuned into each channel, the channel signal is frequency shifted to a preset intermediate frequency and normalized to a preset amplitude level by intermediate frequency amplifier 13. In some embodiments, the audio component of the signal is detected (separated from the composite signal) by audio detector 15 and amplified by audio amplifier 17. The analog audio signal is converted into a digital audio signal by audio A/D converter 20. The digitized signal is sampled by digital signal processor 22.

In some embodiments, the video component of the signal is detected by video detector 24 and amplified by video amplifier 26. The analog video signal is converted into a digital video signal by video A/D converter 28. The digitized signal is sampled by digital signal processor 22 which can also be used to develop one or more signal signatures.

Digital signal processor 22 may contain a conventional integrated circuit programmable signal processor, such as one of Texas Instruments' TMS320C5x family (e.g., TMS320C51), or Sharp's LH9124.

In a preferred embodiment, the amplified video signal is input to video synchronization (synch) separator 34. The horizontal and vertical synch signals detected by separator 34 as well as the amplified video signal are input to signal decoder 36. Signal decoder 36 is capable of decoding information encoded on one or more lines in the vertical blanking interval of the video signal, such as the information encoded on line 21, and may have other capabilities.

In situations in which EDS data are encoded in the video signal, the authorized user may input specific rating codes (V, L, N, etc.) for programs which are desired to be blocked. Alternately, if the EDS data include the titles of transmitted programs, the authorized user may select specific program titles to be allowed. Decoder 36 is used to obtain a program signature in the form of a program identifier code or program name. Decoder 36 may be Philips Semiconductors' line twenty-one acquisition and display (LITOD) SAA5252, ITT Semiconductors' programmable video signal processor, Datawave, Digit 2000, Digit 3000 or CCD3000, Zilog Inc.'s closed caption control device, Z86128, or Sanyo Semiconductor Corp.'s microcontroller for closed caption systems. Decoder 36 either allows a particular composite television signal to be routed to TV receiver 40 if the criteria for allowing the program have been met, or alternately, replaces the particular signal with the blocking signal generated by on-screen display generator 38 if the criteria for allowing the program have not been met. In a preferred embodiment, microcontroller 5 controls decoder 36, but decoder 36 may contain its own microcontroller and other integrated circuits as well.

In situations where EDS data are not encoded in the video signals, digital signal processor 22 may be used to determine whether the signatures of sample(s) of digitized audio signal or video signal or both signals from each scanned channel correlate with one or more reference signal signatures that are stored in a memory means, such as random access memory 32. In a preferred embodiment, the pattern recognition technique disclosed by Moon et al. in U.S. Pat. No. 3,919,479 (Nov. 11, 1975) is used. In another preferred embodiment, one of the signal recognition techniques disclosed by Kenyon et al. in U.S. Pat. Nos. 4,450,531 (May 22, 1984) and 4,843,562 (Jun. 27, 1989) is used. In other embodiments, one of the other prior art signal recognition techniques described above is used.

In an alternative embodiment, digital signal processor 22 contains a fuzzy pattern comparitor, such as American Neuralogix Inc.'s NLX-110. In this embodiment, either Hamming or Euclidian distance metrics are used to determine whether the patterns of sample(s) of digitized audio signal or video signal or both signals from each scanned channel match one or more reference patterns.

In each case of the non-EDS embodiment, the decoder 36 passes the composite signal to the TV receiver 40 if the signal matches the reference pattern(s), or alternately, replaces the signal with the blocking signal from generator 38 if the signal does not match the reference pattern(s). Each blocking signal is transmitted to the TV receiver 40 at the frequency of the composite video signal which it replaced, so that the channel selector of the TV receiver 40 is used in the normal manner to select programs.

In an alternative embodiment, the TV receiver is set to a fixed channel (for example, channel 3), and the selection of the desired viewing channel is made through a user input command to microcontroller 5. In this embodiment, the signal decoder 36 outputs only one composite signal, and the frequency of this signal will be at the frequency of the preset channel (channel 3) of the TV receiver. The signal which is output by decoder 36 will be either the channel selected by microcontroller 38, if the criteria for allowing the signal have been met, or alternately, the blocking signal from generator 38 if the criteria for allowing the signal have not been met.

Discrimination among radio programs with radio receivers which have preset channels may be achieved by employing the audio portion of the circuitry of FIG. 1 in the non-EDS mode of operation.

Figure 2:
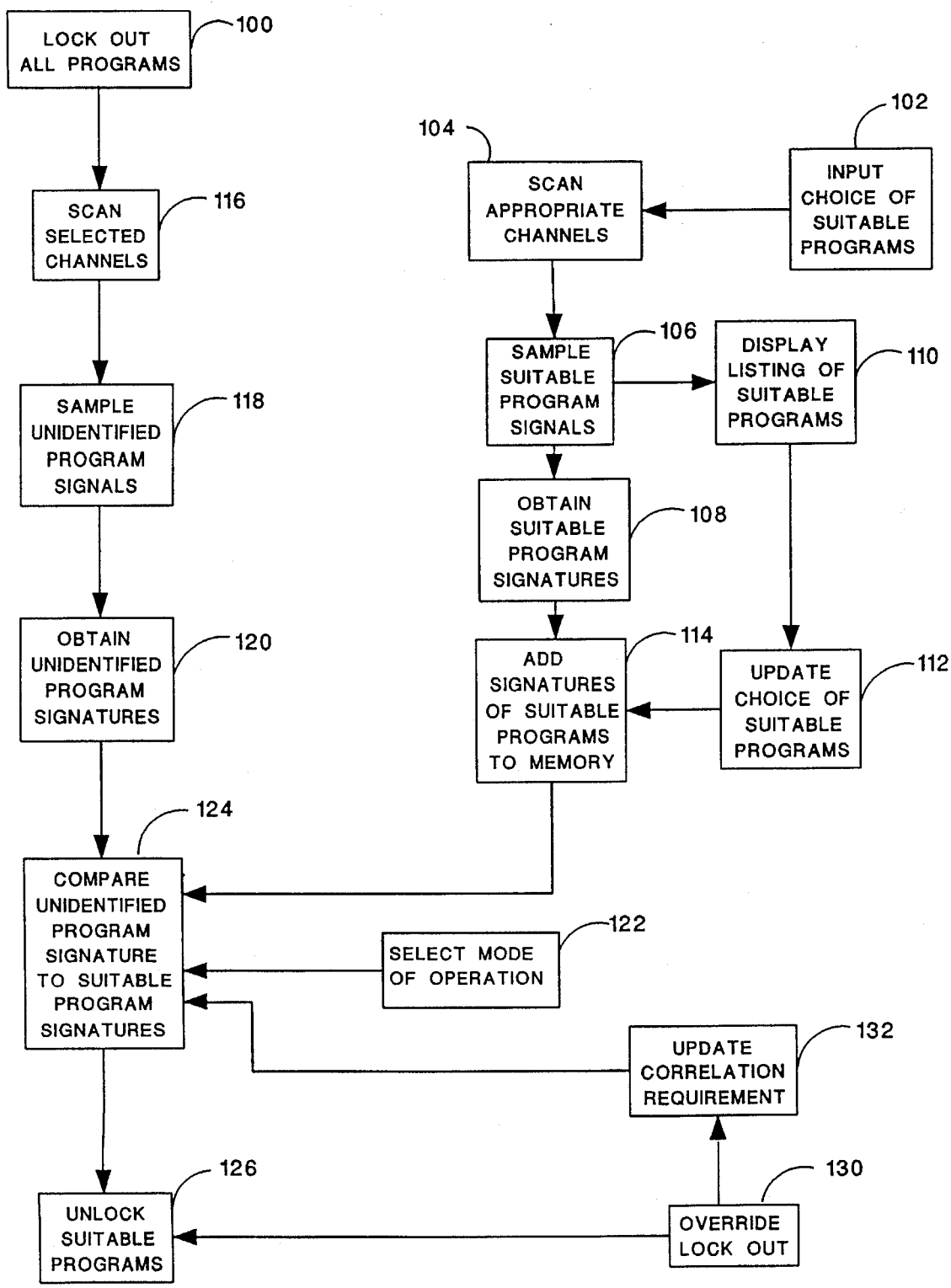
FIG. 2 is a block diagram of a preferred mode of the technique.

The block diagram presented in FIG. 2 discloses the steps of a preferred mode of the process that is implemented by operation of the apparatus disclosed in FIG. 1. In step 100, the device locks out all programs and does not allow any programs to be displayed on the television receiver. In the preferred embodiment, this is the start-up mode of the process. In an alternative embodiment, the device's memory is loaded with potentially suitable programs signatures during manufacture. Alternatively, the program signatures may be stored on a plug-in card or erasable, programmable read only memory (EPROM) that is plugged into the device. For example, the device's memory may contain the program signatures of the theme songs of the top 25 prime time series in its memory.

If desired, however, an authorized user (e.g., a parent with a personal identification number that the device will accept) may input his/her choice of suitable programs in step 102. For example, the parent may input a program name and the channel, day, and start time of a suitable program. In step 104, the programs input in step 102 are scanned by means of a scanning tuner at the appropriate day and time. The program signals are sampled during step 106 and at least one signature of each suitable program is obtained. In step 108, the samples of the suitable programs are digitized and processed in the digital signal processor and/or in the signal decoder.

The signature may be a video signal signature or an audio signal signature. The video signal signature may be an encoded signal (e.g., a signal encoded on line 21) or a signal that is not encoded. The audio signal signature may be a digitally processed program theme song signature or a voice signature. The encoded signal may be one of the packets of data proposed to be part of the Extended Data Service under EIA-608, such as a program name signal, a program duration signal, a program time remaining signal, or the lack of a warning of potentially objectionable program content. The lack of a warning of objectionable program content may be a lack of a warning of violent program content, the lack of a warning of program content involving nudity, the lack of a warning of strong language program content, or the lack of a warning of program content involving drug use.

In step 110, the parent may use a remote controller or set-top keys to cause a program listing to be displayed. In step 112, the parent can use the remote controller or the set-top keys to update or edit the listing of suitable programs. In a preferred embodiment, the listing displays the names of the programs (or other program identifier) that the device is capable of recognizing. If available, rating codes are presented next to the program name. The remote control receiver or the set-top keys is used to scroll through the listing and to select or unselect programs as suitable for child viewing. The listing is displayed either on the TV screen as teletext or on an integral display on the device.

In step 114, at least one signature of each suitable program is added to the device's memory. If the program name is continuously encoded in the signal of all samples of a suitable program, then only that signature is placed in memory, as it will be the only signature that is required to recognize the program as being a suitable program. If that is not the case, then a video signal signature or an audio signal signature or both are placed in memory. Sufficient signatures are placed in memory to allow suitable program signature recognition with a high degree (e.g., 95 percent) of certainty.

During normal operation of the device, step 116, scanning of selected channels, occurs continuously. In situations in which program changes occur only at specific times (e.g., on the hour and half hour), scanning need only occur during those periods. During step 118, the signals of as-yet unidentified programs are sampled. The samples of the unidentified programs are digitized and processed in the digital signal processor and in the signal decoder in step 120 to obtain the signatures of the unidentified programs.

In step 122, the authorized user selects the mode of operation of the device. The three choices for mode of operation are: 1) allow programs whose EDS-encoded titles match a suitable program title stored in memory; 2) block programs whose EDS rating codes match a disallowed rating code stored in memory; 3) allow programs whose non-EDS signal signatures match a suitable program signature stored in memory.

In step 124, the signatures of the unidentified programs are compared with the reference signatures of the suitable programs. If recognition occurs (e.g., the signatures are sufficiently correlated), then the program is unlocked and made available for viewing on the TV receiver in step 126. If either the program is recognized at its beginning and its duration is known or the time remaining is continuously encoded in the program signal, channel scanning need not occur until the suitable program ends. If recognition does not occur the program remains locked. In an alternative embodiment, under these circumstances, the player (receiver) is switched to a channel containing a suitable program. The device may also be capable of switching the player back to the channel from which it was switched after the unsuitable program ceases.

An authorized user (e.g., a parent with a personal identification number that the device will accept) can override the program lock-out feature in step 130. If the device did not correctly recognize the program signature, the correlation (matching) requirement is updated (e.g., relaxed) in step 130.

To a person skilled in the art, reference to FIGS. 1 and 2 and the above disclosure will also enable the invention to be practiced in the field of radio signal recognition and choice. In fact, the composite television signal contains a frequency-modulated (FM) radio signal. Thus, the portions of FIG. 1 that apply to signal tuning and audio signal detection, amplification, and A/D conversion and digital signal processing are also applicable to radio program recognition and choice. In this embodiment, the signal decoder is used to decode signals encoded in an audio signal.

Many variations of the invention will occur to those skilled in the art. For example, the apparatus could be a component of a radio or television receiver instead of being a set-top device. In these embodiments, fewer components and a different arrangement of components would possibly be required. As another example, the device may be programmable to continuously unlock one or more channels that contain only suitable programs, such as the Disney Channel. All such variations within the scope of the claims are intended to be within the scope and spirit of the invention.

We claim:

1. A method for electronic media program recognition and choice comprising the steps of locking out all programs, scanning available broadcast channels, inputting at least one program choice to a memory means, sampling at least one signal of at least one suitable program, obtaining at least one signature of said at least one suitable program, storing in the memory means said at least one signature of said at least one suitable program, scanning a plurality of broadcast channels, sampling at least one signal of at least one unidentified program, obtaining at least one signature of said at least one unidentified program, comparing said at least one signature of at least one unidentified program with at least one signature of at least one suitable program, and making at least a portion of said suitable program available to a player.

2. The method of claim 1 wherein said at least one signature is selected from a group consisting of a video signal signature, and an audio signal signature.

3. The method of claim 2 wherein said video signal signature is selected from a group consisting of an encoded signal, and a signal that is not encoded.

4. The method of claim 2 wherein the audio signal signature is a digitally processed program theme song signature.

5. The method of claim 3 wherein said encoded signal is at least one encoded signal selected from a group consisting of a program name signal, a program duration signal, and a lack of a warning of potentially objectionable program content.

6. The method of claim 5 wherein said signal warning of objectionable program content is at least one signal selected from a group consisting of a lack of a warning of violent program content, a lack of a warning of program content involving nudity, a lack of a warning of strong language program content, and a lack of a warning of program content involving drug use.

7. The method of claim 1 wherein said program is not broadcast.

8. The method of claim 1 wherein the comparing step occurs periodically during the scanning of said channels.

9. The method of claim 1 wherein the comparing step occurs once during each program and information concerning the channel and timing of programs thus recognized is used to determine when the comparing step is to be accomplished next.

10. A method for electronic media program recognition and choice comprising the steps of locking out all programs except programs on channels that broadcast only suitable programs, obtaining at least one signature of a suitable program, storing in a memory means said at least one signature of a suitable program, scanning at least selected broadcast channels, sampling the signal of at least one unidentified program, obtaining a signature of at least one unidentified program, comparing said signature of at least one unidentified program with at least one signature of a suitable program, and making at least a portion of said suitable program available to a player, wherein said at least one signature of a suitable program and said signature of at least one unidentified program are obtained from signals that are not coded or encoded.

11. A method for electronic media program recognition and choice comprising the steps of locking out all programs, obtaining at least one signature of a suitable program, storing in a memory means said at least one signature of a suitable program, scanning at least selected broadcast channels, sampling a signal of at least one unidentified program, obtaining a signature of at least one unidentified program, comparing said signature of at least one unidentified program with at least one signature of a suitable program, and switching a player to a channel having a suitable program, wherein said at least one signature of a suitable program and said signature of at least one unidentified program are obtained from signals that are not coded or encoded.

12. The method of claim 11 further comprising switching said player back to the channel from which it was switched after an unsuitable program ceases.

13. An apparatus for electronic media program recognition and choice comprising:

means for locking out all programs, means for scanning available broadcast channels, means for inputting at least one program choice to a memory means, means for sampling at least one signal of at least one suitable program, means for obtaining at least one signature of said at least one suitable program, means for storing in the memory means said at least one signature of said at least one suitable program, means for scanning a plurality of broadcast channels, means for sampling at least one signal of at least one unidentified program, means for obtaining at least one signature of said at least one unidentified program, means for comparing said at least one signature of at least one unidentified program with at least one signature of at least one suitable program, and means for making at least a portion of said suitable program available to a player.

14. An apparatus for electronic media program recognition and choice comprising:

means for locking out all programs except programs on channels that broadcast only suitable programs, means for obtaining at least one signature of a suitable program, means for storing in a memory means said at least one signature of a suitable program, means for scanning at least selected broadcast channels, means for sampling the signal of at least one unidentified program, means for obtaining a signature of at least one unidentified program, means for comparing said signature of at least one unidentified program with at least one signature of a suitable program, and means for making at least a portion of said suitable program available to a player, wherein said at least one signature of a suitable program and said signature of at least one unidentified program are obtained from signals that are not coded or encoded.

15. An apparatus for electronic media program recognition and choice comprising:

means for locking out all programs, means for obtaining at least one signature of a suitable program, means for storing in a memory means said at least one signature of a suitable program, means for scanning at least selected broadcast channels, means for sampling a signal of at least one unidentified program, means for obtaining a signature of at least one unidentified program, means for comparing said signature of at least one unidentified program with at least one signature of a suitable program, and means for switching a player to a channel having a suitable program, wherein said at least one signature of a suitable program and said signature of at least one unidentified program are obtained from signals that are not coded or encoded.

16. The apparatus for enabling automatic electronic media program choice comprising means for locking out a plurality of electronic media programs, means for deriving a first signature from a signal of a suitable program, means for deriving a second signature from a signal of an unknown program, means for comparing said first and second signatures, and means for unlocking an electronic media program whereby said program is capable of being played, wherein said first signature and said second signature are obtained from signals that are not coded or encoded.

17. The apparatus of claim 16 further comprising means for scanning a plurality of electronic media transmissions.

18. The apparatus of claim 16 wherein both means for deriving a signature from a signal comprising a digital signal processor.

19. The apparatus of claim 16 wherein both means for deriving a signature from a signal comprises a signal decoder.

20. The apparatus of claim 19 wherein the signal decoder is a programmable digital signal processor selected from the group consisting of a line twenty-one acquisition and display, a programmable video signal processor, a closed caption control device, and a microcontroller for closed caption systems.

* * * * *